US008028356B2

(12) United States Patent
Kao et al.

(10) Patent No.: US 8,028,356 B2
(45) Date of Patent: Oct. 4, 2011

(54) WATER CONTROLLING VALVE

(75) Inventors: Yu-Yueh Kao, Taipei (TW); Chih-Hung Kao, Taipei (TW)

(73) Assignee: Highplus International Co., Ltd (TW)

( * ) Notice: Subject to any disclaimer, the term of this patent is extended or adjusted under 35 U.S.C. 154(b) by 548 days.

(21) Appl. No.: 12/281,036

(22) PCT Filed: Mar. 16, 2006

(86) PCT No.: PCT/CN2006/000407
§ 371 (c)(1),
(2), (4) Date: Aug. 28, 2008

(87) PCT Pub. No.: WO2007/104184
PCT Pub. Date: Sep. 20, 2007

(65) Prior Publication Data
US 2009/0045370 A1    Feb. 19, 2009

(51) Int. Cl.
*F16K 31/00*    (2006.01)
(52) U.S. Cl. .............. 4/678; 119/72; 137/801; 222/509; 239/583; 251/229; 251/230; 251/319; 251/330
(58) Field of Classification Search .................. 251/339, 251/229, 230, 319; 137/801; 4/678; 222/509; 119/72; 239/583
See application file for complete search history.

(56) References Cited

U.S. PATENT DOCUMENTS

| | | | |
|---|---|---|---|
| 4,512,551 A | 4/1985 | Dalferth | |
| 4,940,206 A * | 7/1990 | Chung-Shan | 251/52 |
| 5,065,700 A * | 11/1991 | Cross | 119/72.5 |
| 5,203,376 A * | 4/1993 | Chung-Shan | 137/801 |
| 5,456,448 A | 10/1995 | Chou | |
| 5,704,397 A * | 1/1998 | Lu | 137/630.15 |
| 6,739,572 B2 * | 5/2004 | Shen et al. | 251/52 |
| 6,942,195 B2 * | 9/2005 | Kao | 251/339 |
| 7,143,997 B2 * | 12/2006 | Kao | 251/339 |

FOREIGN PATENT DOCUMENTS

| | | |
|---|---|---|
| CN | 2636004 | 8/2004 |
| CN | 2667249 | 12/2004 |

OTHER PUBLICATIONS

Search Report of International Application No. PCT/CN2006/000407.

* cited by examiner

*Primary Examiner* — John Bastianelli
(74) *Attorney, Agent, or Firm* — Hershkovitz & Associates, LLC; Abraham Hershkovitz

(57) ABSTRACT

A water controlling valve includes an outer sheet, an end cap and a control valve group. The control valve group is disposed between a flowing bore in the outer sheet and a water bore in the end cap. The water controlling valve is connected with the outlet of a water tube. When the control valve group is pushed upwards, the water bore in the end cap and the flowing bore in the outer sheet are closed in a predetermined sequence, then the water in the tube will not flow out. When the control valve group is pushed downwards, the flowing bore in the outer sheet and the water bore in the end cap are opened, then the water will flow out. When the water is stopped, the occurring positive or negative pressure wave is lowered, and then the vibration and the raspy noise will be avoided.

13 Claims, 6 Drawing Sheets

WATER CONTROLLING VALVE

BACKGROUND OF THE INVENTION

1. Field of the Invention

The present invention relates to a water controlling valve, especially to a structure that is pushed to close the valve.

2. Description of the Prior Arts

Infrared-ray controlling switches are representative of the water switches currently available on market. When washing, the user needs to put the hands at a certain position to switch on the infrared-ray controlling switch. Then the faucet starts to supply water. However, the infrared-ray controlling switch has disadvantages. Because the time for the infrared-ray controlling switch to supply water is limited, the user is unable to finish washing within the duration of one switching-on. The user needs to switch on the infrared-ray controlling switch once again to finish washing. Further, the reaction of the infrared-ray controlling switch is not sensitive enough so the infrared-ray controlling switch is only switched on when the user puts the hands at the certain position. To solve the aforementioned problem, the conventional water controlling valves are developed.

With reference to FIGS. 6 and 7, the conventional water controlling valve comprises a barrel (50), a control valve group (60) and a bottom cap (70).

The barrel (50) has a stepped top recess (51) being formed in a top end. A through hole (52) is formed in the bottom of the top recess (51). A stepped bottom recess (53) is formed in a bottom end of the barrel (50). The top recess (51) communicates with the bottom recess (53) through the through hole (52).

The control valve group (60) comprises a spindle (61), a valve seat (62), a pushing rod (63) and an abutting rod (64).

The spindle (61) has a conical closed head (611). The closed head (611) is mounted in the top recess (51). A protruding rod (612) is connected to a bottom of the closed head (611). The protruding rod (612) is mounted into the bottom recess (53) through the through hole (52). A sidewall of the protruding rod (612) has multiple side wings (613) being separately protruding out from the sidewall.

The valve seat (62) is mounted in the bottom recess (53). An edge of the valve seat (62) abuts an inner edge of the bottom recess (53). The valve seat (62) has a through hole (621) being mounted through by the protruding rod (612). Multiple inclined edges (622) are saw-toothed and are formed on an inside wall of the through hole (621). Multiple guiding channels (623) are formed respectively between adjacent inclined edges (622). Multiple flowing bores (624) are formed separately through the valve seat (62) around the through hole (621).

The pushing rod (63) has a mounting cavity (631) being mounted through by the protruding rod (612). Multiple pushing sheets (632) are formed separately on and protrude from a sidewall of a top end of the pushing rod (63).

The abutting rod (64) has a receiving hole (641) being formed in a top end to be mounted by the pushing rod (63). Multiple inclined edges (642) are saw-toothed and are formed on the top end of the abutting rod (64). Multiple guiding protrusions (643) are formed on and protrude from a sidewall of the top end and are mounted slidably in the guiding channels (623). A bottom end of the abutting rod (64) protrudes out of the through hole (621) of the valve seat (62).

The bottom cap (70) is mounted securely in the bottom recess (53). The bottom cap (70) has an opening (71) abutting a bottom end of the valve seat (62) to mount the control valve group (60) in the barrel (50). Multiple water bores (72) are formed separately through the bottom cap (70) around the opening (71).

When in use, the conventional water controlling valve is connected to a faucet. The bottom end of the abutting rod (64) is pushed to allow water to flow out from the faucet. When the bottom end of the abutting rod (64) is pushed, the inclined edges (642) on the top end of the abutting rod (64) abut the pushing sheets (632) of the pushing rod (63) to push the pushing rod (63). When the top ends of the pushing sheets (632) abut the bottom ends of the side wings (613) of the protruding rod (612), the closed head (611) leaves the through hole (52) to open the trough hole (52). Therefore, water flows into the bottom recess (53) through the through hole (52), and then water flows out of the barrel (50) through the flowing bores (624) and the water bores (72) in sequence. Thus, the user may proceed with washing.

When washing procedure is finished, the abutting rod (64) is pushed again to allow the guiding protrusions (643) to enter the guiding channels (623) and to abut the bottom ends of the guiding channels (623). Then the abutment aforementioned no more exists. Therefore, the top end of the closed head (611) is shut down by the pushing of the water to seal the through hole (52). Thus, water does not flow out.

As described, the water supplying time is easily controlled by the simple mechanical movements. When the conventional water controlling valve is closed, the water in the water tube still pushes toward. Therefore, at the transient time when the conventional water controlling valve is closing, the kinetic energy of the pushing water becomes elasticity energy to generate a series of positive and negative pressure waves that vibrate in the water tube back and forth. The pressure waves do not stop until resisted by the abrasion. Thus, the vibration of the water tube results in raspy noises.

SUMMARY OF THE INVENTION

To overcome the disadvantages as aforementioned of the conventional water controlling valve, the water controlling valve of the present invention provides a structure that closes the valve by pushing.

To achieve the objective of the present invention, the present invention provides a water controlling valve comprising:
  a sleeve having an opening;
  an end cap being mounted on a top surface of the sleeve and having
    a mounting cavity being formed in a top end of the end cap; and
    a water bore being formed through a bottom end of the mounting cavity; and
  a control valve group having
    a valve seat being mounted in the opening of the sleeve and having
      a through hole being formed through a center of the valve seat;
      multiple inclined edges being formed on an inside wall of the through hole of the valve seat; and
      multiple guiding channels being formed respectively between adjacent inclined edges of the valve seat;
    a pushing rod being mounted in the through hole of the valve seat and having
      a mounting cavity being formed in a top of the pushing rod;
      multiple inclined edges being formed on the top of the pushing rod; and multiple guiding protrusions being formed on a sidewall of the top of the pushing rod;
an abutting seat having
   a through hole; and
   multiple abutting protrusions being formed separately on and protruding from a lower surface of the abutting seat and selectively abutting the inclined edges of the pushing rod;
a connecting rod having a bottom end being mounted through the through hole of the abutting seat and protruding into the mounting cavity of the pushing rod; and
a pushing seat having
   an aperture being mounted through by a connecting end of the connecting rod; and
   a bottom end selectively abutting an upper surface of the abutting seat.

The water controlling valve is mounted on the outlet of the faucet. When the water controlling valve is pushed upward, the flowing bore of the outer sheet and the water bore of the end cap are sealed in sequence to keep the water from flowing. On the other hand, when the water controlling valve is pushed upward again, the flowing bore of the outer sheet and the water bore of the end cap are opened in sequence to allow the water to flow out.

With the aforementioned movement, when the outlet of the faucet is closed, the water controlling valve as described is closed gradually to reduce the positive and negative pressure waves generated when the water flow is being stopped. Thus, the water tube is kept from vibrating and from producing raspy noise.

BRIEF DESCRIPTION OF THE DRAWINGS

FIG. 6 is a cross-sectional view of a conventional water controlling valve; and

ELEMENTS REFERENCED NUMBER LIST

| (10): sleeve | (11): opening |
|---|---|
| (111): inner flange | (12): bottom cap |
| (121): rod bore | (122): water outlet |
| (20): control valve group | (21): valve seat |
| (211): through hole | (212): inclined edge |
| (213): guiding channel | (214): water bore |
| (215): cylinder | (22): pushing rod |
| (221): mounting cavity | (222): inclined edge |
| (223): guiding protrusion | (23): abutting seat |
| (231): through hole | (232): abutting protrusion |
| (24): connecting rod | (241): connecting hole |
| (25): pushing seat | (251): aperture |
| (26): valve body | (261): aperture |
| (27): closed head | (271): protruding rod |
| (30): end cap | (31): mounting cavity |
| (311): water bore | (32): outer sheet |
| (321): flowing bore | (33): filter |
| (40): faucet | (50): barrel |
| (51): top recess | (52): through hole |
| (53): bottom recess | (60): control valve group |
| (61): spindle | (611): closed head |
| (612): protruding rod | (613): side wing |
| (62): valve seat | (621): protruding end |
| (622): inclined edge | (623): guiding channel |
| (624): flowing bore | (63): pushing rod |
| (631): mounting cavity | (632): pushing channel |
| (64): abutting rod | (641): receiving hole |
| (642): inclined edge | (643): guiding protrusion |
| (70): bottom cap | (71): opening |
| (72): water bore | |

DETAILED DESCRIPTION OF THE PREFERRED EMBODIMENTS

Figure 1:
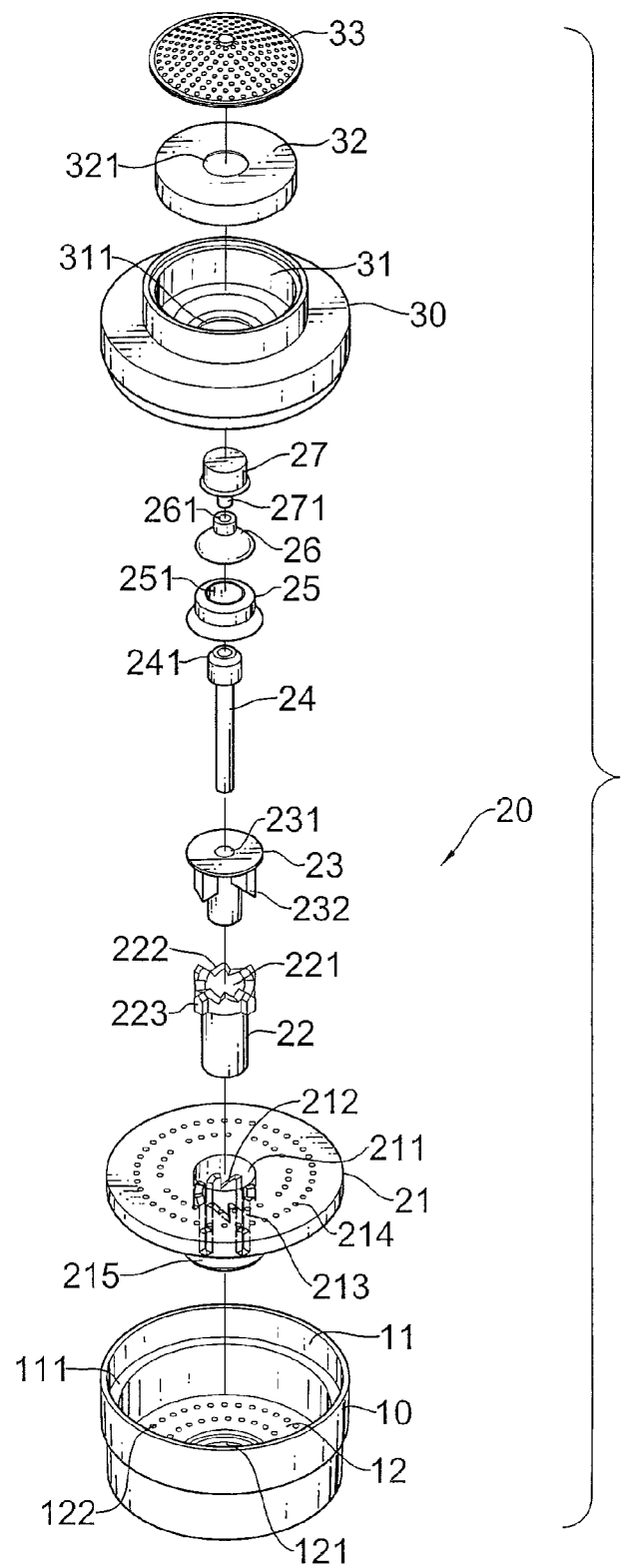
FIG. 1 is an exploded perspective view of the present invention.

With reference to FIG. 1, a water controlling valve in accordance with the present invention comprises a sleeve (10), a control valve group (20) and an end cap (30).

The sleeve (10) has an opening (11) being formed in a top surface. An inner flange (111) is formed annularly on an inside wall of the opening (11). A bottom cap (12) is mounted on a bottom end of the sleeve (10). A rod bore (121) is formed through a center of the bottom cap (12). Multiple water outlets (122) are formed separately through the bottom cap (12) around the rod bore (121).

The control valve group (20) comprises a valve seat (21), a pushing rod (22), an abutting seat (23), a connecting rod (24), a pushing seat (25), a valve body (26) and a closed head (27).

The valve seat (21) is mounted in the opening (11) of the sleeve (10). An annular edge of the valve seat (21) abuts the inner flange (111) of the sleeve (10). A cylinder (215) protrudes from a bottom of a center of the valve seat (21). A through hole (211) is formed through the cylinder (215). Multiple inclined edges (212) are saw-toothed and are formed on an inside wall of the through hole (211). Multiple guiding channels (213) are formed respectively between adjacent inclined edges (212). Multiple water bores (214) are formed separately through a top of the valve seat (21) around the through hole (211).

The pushing rod (22) is mounted in the through hole (211) of the valve seat (21) and protrudes out of the rod bore (121) of the end cap (12). A mounting cavity (211) is formed in a top of the pushing rod (22). Multiple inclined edges (222) are saw-toothed and are formed on the top of the pushing rod (22). Multiple guiding protrusions (223) are formed on a sidewall of the top of the pushing rod (22). The guiding protrusions (223) selectively abut the inclined edges (212) of the seat (21) and selectively abut bottom ends of the guiding channels (213).

The abutting seat (23) has a central through hole (231). Multiple abutting protrusions (232) are formed separately on and protrude out from a lower surface of the abutting seat (23). The abutting protrusions (232) selectively abut the inclined edges (222) of the pushing rod (22).

The connecting rod (24) has a bottom end being mounted through the through hole (231) of the abutting seat (23) and protruding into the mounting cavity (221) of the pushing rod (22). A connecting hole (241) of the connecting rod (24) is formed in a top end of the connecting rod (24).

The pushing seat (25) has an aperture (251) being mounted through by the connecting end of the connecting rod (24). A bottom end of the pushing seat (25) selectively abuts an upper surface of the abutting seat (23).

The valve body (26) has an aperture (261).

The closed head (27) has a protruding rod (271) protruding out from a bottom end of the closed head (27). The protruding rod (271) is mounted through the aperture (261) of the valve body (26) and is mounted securely in the connecting hole (241) of the connecting rod (24) to clamp the valve body (26) securely between the closed head (27) and the connecting rod (24). A top end of the closed head (27) is conical.

The end cap (30) is mounted on the top surface of the sleeve (10). A mounting cavity (31) is formed in a top end of the end cap (30). A water bore (311) is formed through a bottom end of the mounting cavity (31) of the end cap (30) and is selectively sealed by the pushing seat (25). An outer sheet (32) is mounted in the mounting cavity (31) of the end cap (30). A flowing bore (321) is formed through a center of the outer sheet (32) and is selectively sealed by the closed head (27). A conical filter (33) is mounted on a top end of the outer sheet (32).

Figure 2:
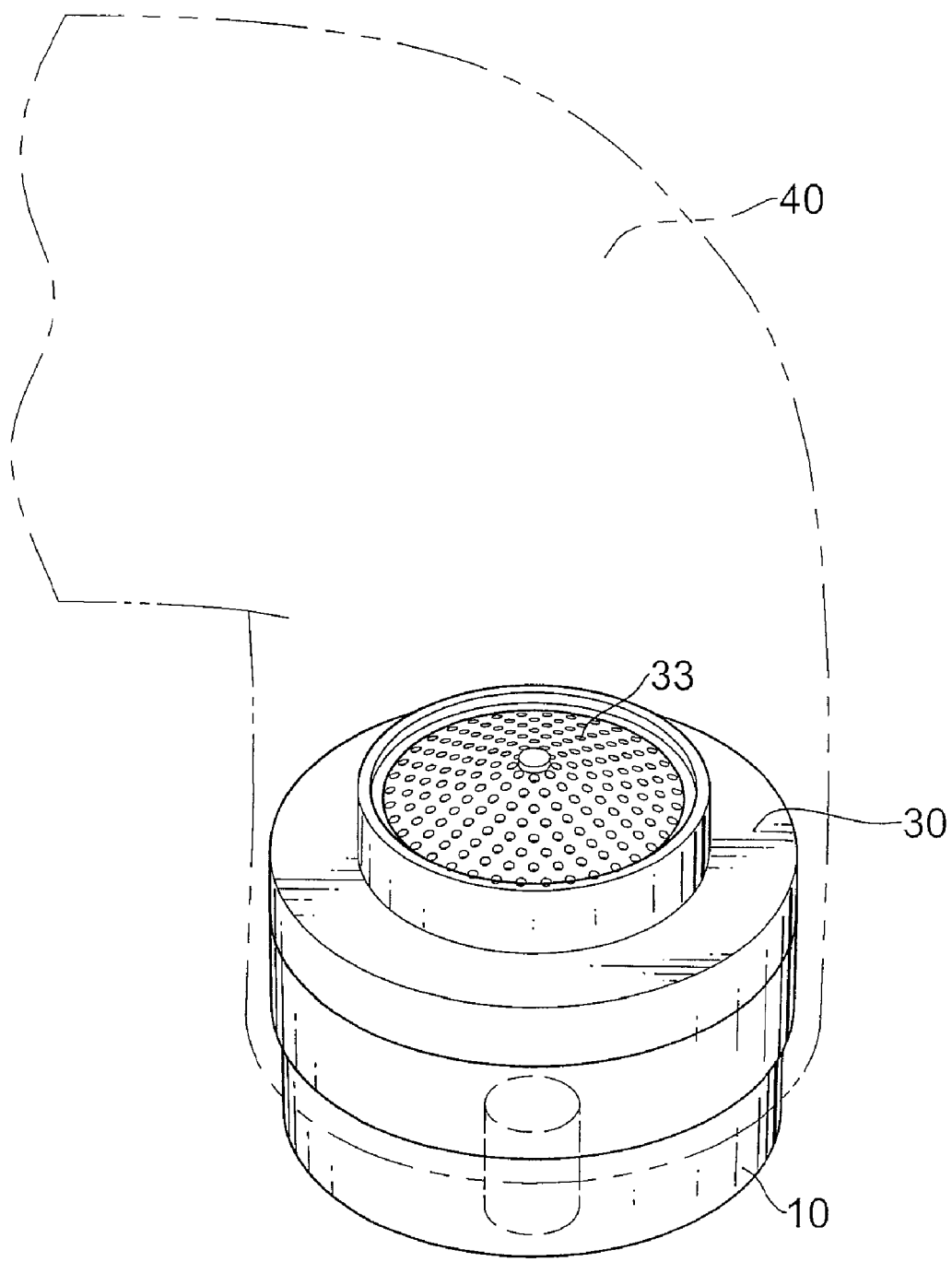
FIG. 2 is an illustrating view of the present invention being connected with a faucet.
Figure 3:
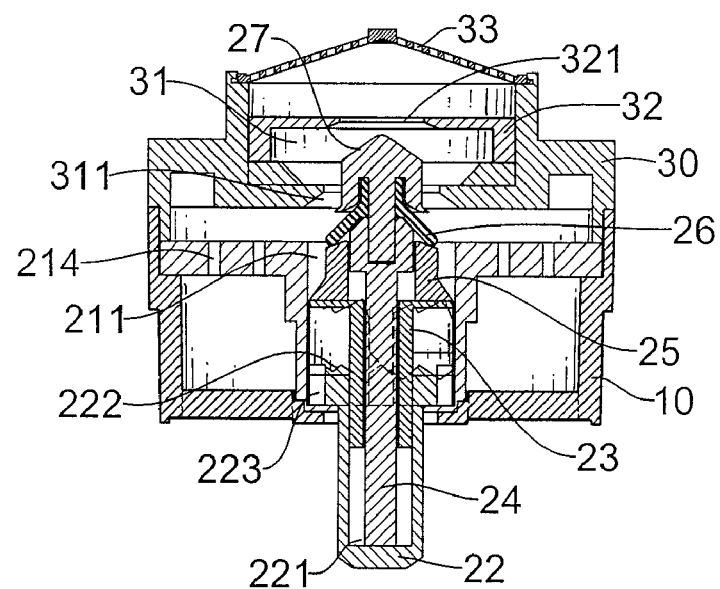
FIG. 3 is a cross-sectional view of the present invention.

With further reference to FIG. 2, the sleeve (10) is connected to an outlet of a faucet (40). With further reference to FIG. 3, when using, water flows in sequence through the filter (33), the flowing bore (321) of the outer sheet (32), the water bore (311) of the end cap (30) and the water bores (211) of the valve seat (21). Then water flows out of the water outlets (122) of the bottom cap (12). Further, a filter (not shown) may be mounted between the bottom of the valve seat (21) and the bottom cap (12). With dual filtering by the filter (33) and the filter, the quality of the water flowing out is better.

With further reference to FIG. 3, to stop the water flow, the pushing rod (22) is pushed upward. The pushing rod (22) contacts the bottom end of the connecting rod (24) to push the closed head (27) upward to seal the flowing bore (321) of the outer sheet (32). The movement as described is a first step of the closing movement. Further, the guiding protrusions (223) of the pushing rod (22) move along the guiding channels (213) of the valve seat (21). During the moving, the inclined edges (222) of the pushing rod (22) abut the abutting protrusions (232) of the abutting seat (23) so the abutting seat (23) is pushed by the pushing rod (22).

The pushed abutting seat (23) pushes the pushing seat (25) and the closed head (27) in sequence. When the pushing rod (22) is moved at a certain position, bottom ends of the guiding protrusions (223) of the pushing rod (22) abut the inclined edges (212) of the valve seat (21). Therefore, the closed head (27) and the pushing seat (25) respectively seal the flowing bore (321) of the outer sheet (32) and the water bore (311) of the end cap (30). The valve body (36) is used to completely seal the water bore (311) (the closing status is shown in FIGS. 4 and 5) to keep from leaking.

Figure 4:
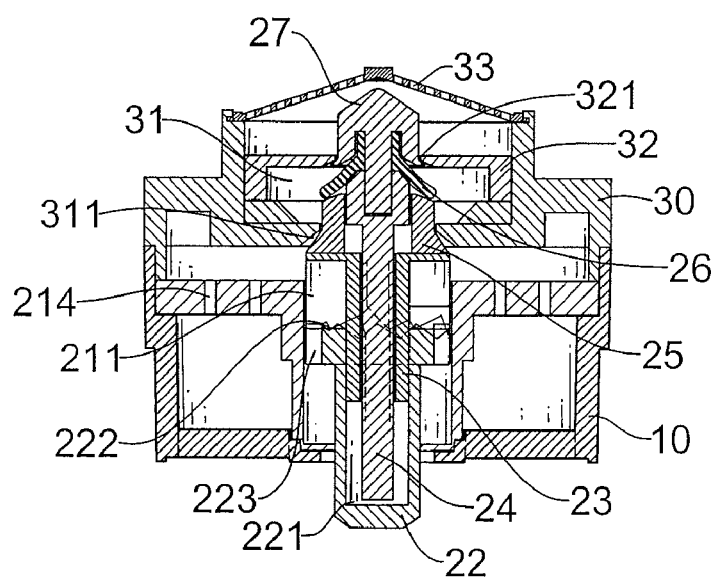
FIG. 4 is another cross-sectional view of the present invention.
Figure 5:
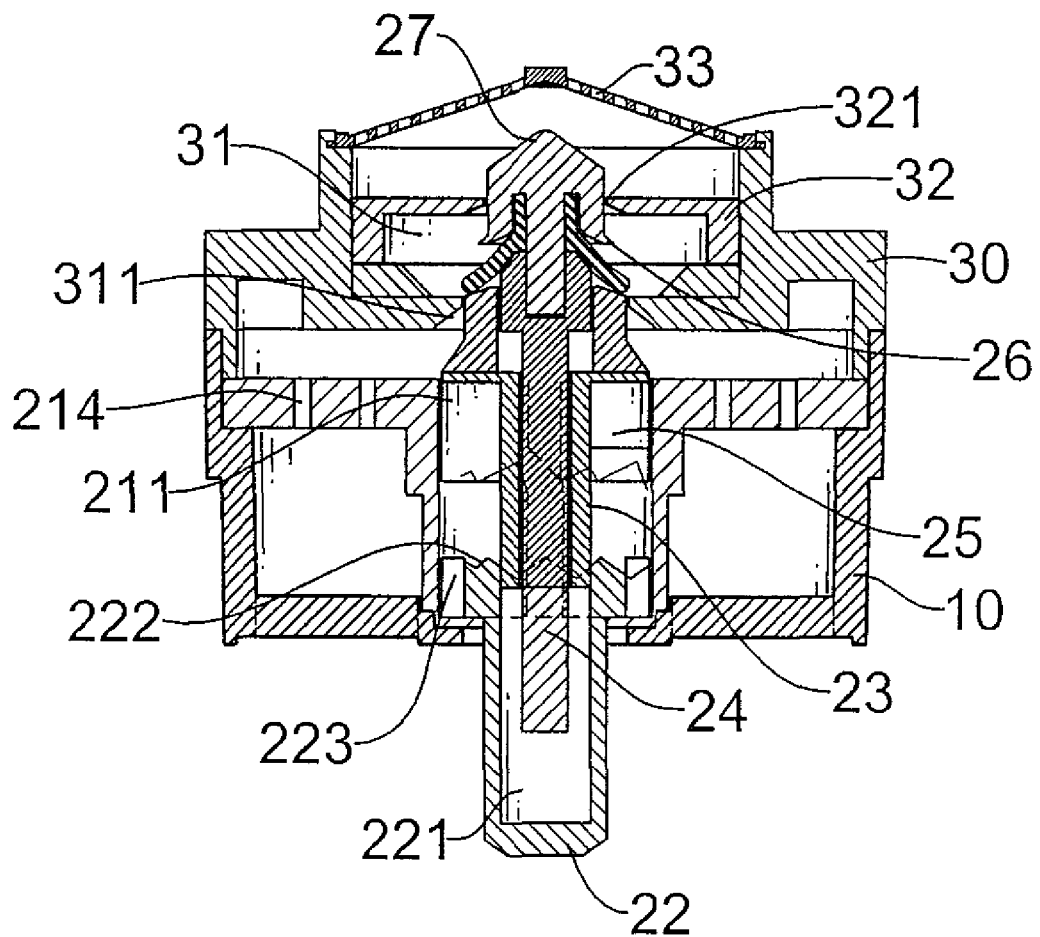
FIG. 5 is still another cross-sectional view of the present invention.
Figure 6:
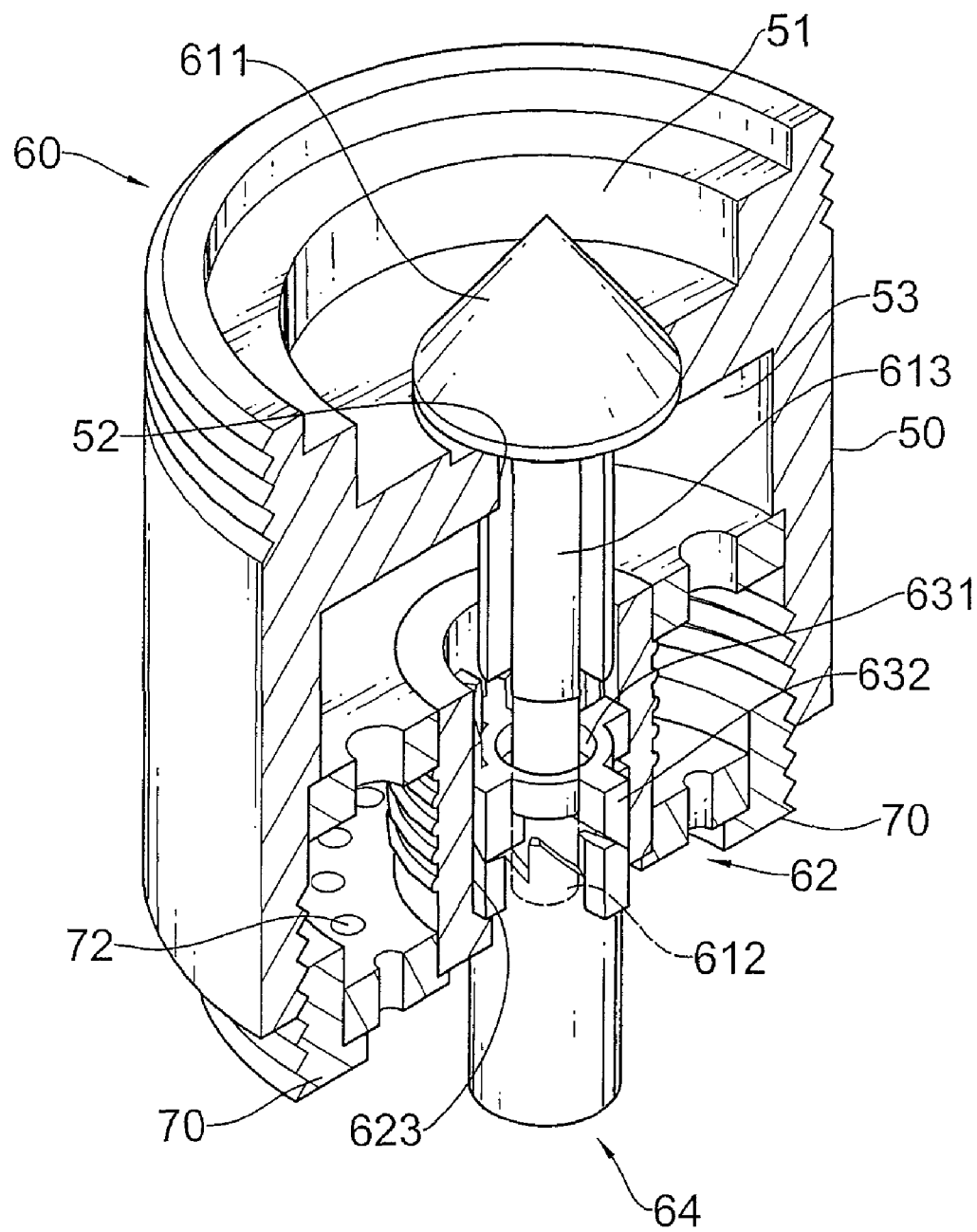
FIG. 6 is a cross-sectional view of a conventional controlling valve.
Figure 7:
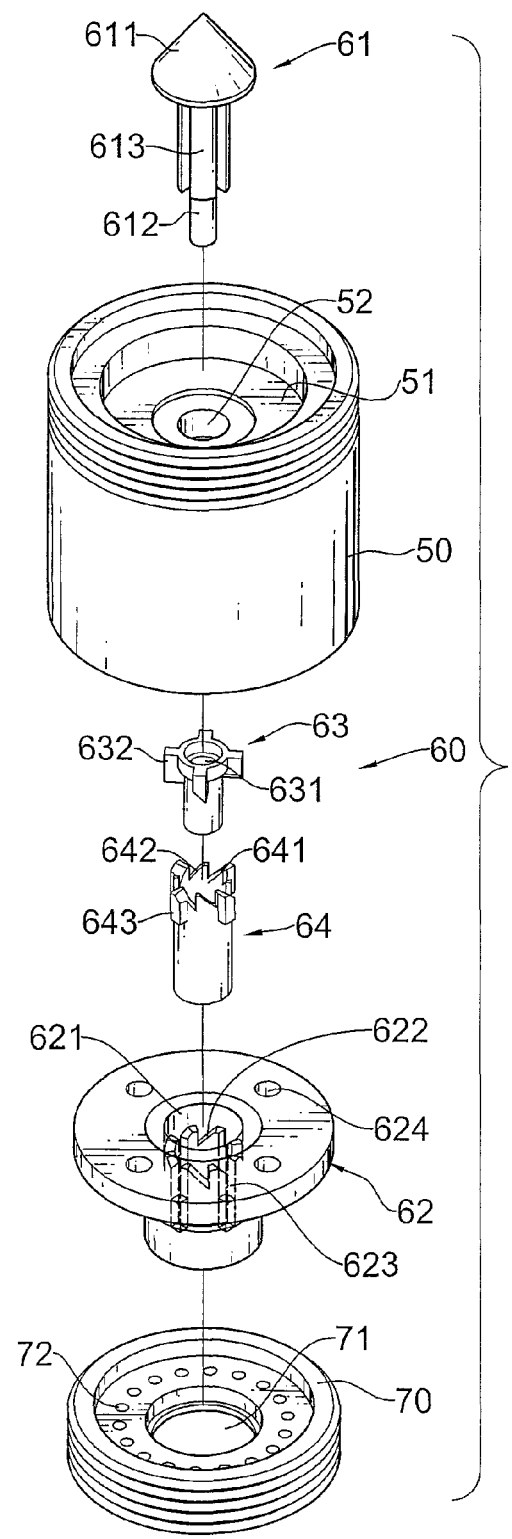
FIG. 7 is an exploded perspective view of the conventional water controlling valve.

With further reference to FIGS. 4 and 5, to start the water flow, the pushing rod (22) is pushed again, the guiding protrusions (223) of the pushing rod (22) move along the inclined edges (212) of the valve seat (21) to enter the guiding channels (213) and to abut the bottom end of the guiding channel (213). Therefore, the aforementioned closing status no longer exists to allow the water to flow out of the water outlets (122) of the bottom cap (12) once again (the opening status is shown in FIG. 3).

Therefore, when the outlet of the faucet (40) is closed, the water controlling valve as described is closed gradually to reduce the positive and negative pressure waves generated when the water flow is being stopped. Thus, the water tube is kept from vibrating and from producing raspy noise.

What is claimed is:

1. A water controlling valve comprising:
   a sleeve having an opening;
   an end cap being mounted on a top surface of the sleeve and having
      a mounting cavity being formed in a top end of the end cap; and
      a water bore being formed through a bottom end of the mounting cavity; and
   a control valve group having
      a valve seat being mounted in the opening of the sleeve and having
         a through hole being formed through a center of the valve seat;
         multiple inclined edges being formed on an inside wall of the through hole of the valve seat; and
         multiple guiding channels being formed respectively between adjacent inclined edges of the valve seat;
      a pushing rod being mounted in the through hole of the valve seat and having
         a mounting cavity being formed in a top of the pushing rod;
         multiple inclined edges being formed on the top of the pushing rod; and
         multiple guiding protrusions being formed on a sidewall of the top of the pushing rod;
      an abutting seat having
         a through hole; and
         multiple abutting protrusions being formed separately on and protruding from a lower surface of the abutting seat and selectively abutting the inclined edges of the pushing rod;
      a connecting rod having a bottom end being mounted through the through hole of the abutting seat and protruding into the mounting cavity of the pushing rod; and
      a pushing seat having
         an aperture being mounted through by a connecting end of the connecting rod; and
         a bottom end selectively abutting an upper surface of the abutting seat.

2. The water controlling valve as claimed in claim 1, wherein
   the valve seat has a cylinder being formed on a bottom of the valve seat; and
   the through hole of the valve seat is formed through the cylinder of the valve seat.

3. The water controlling valve as claimed in claim 2, wherein
   the inclined edges of the valve seat are saw-toothed; and
   the inclined edges of the pushing rod are saw-toothed.

4. The water controlling valve as claimed in claim 3 further comprising an outer sheet being mounted in the mounting cavity of the end cap.

5. The water controlling valve as claimed in claim 4, wherein the outer sheet has a flowing bore.

6. The water controlling valve as claimed in claim 5 further comprising a closed head being connected to a top end of the connecting rod.

7. The water controlling valve as claimed in claim 6, wherein
   the connecting rod has a connecting hole being formed in the top end of the connecting rod; and
   the closed head has a protruding rod being formed on and protruding from a bottom end of the closed head and being mounted securely in the connecting hole of the connecting rod.

8. The water controlling valve as claimed in claim 7, wherein the valve seat has multiple water bores being formed separately through a top of the valve seat around the through hole of the valve seat.

9. The water controlling valve as claimed in claim 8 further comprising a valve body being mounted between the closed head and the top end of the connecting rod.

10. The water controlling valve as claimed in claim 9, wherein the sleeve has an inner flange being formed annularly on an inside wall of the opening of the sleeve; and an annular edge of the valve seat abuts the inner flange of the sleeve.

11. The water controlling valve as claimed in claim 10, wherein the sleeve further has a bottom cap being mounted in a bottom end of the opening of the sleeve and having a rod bore being formed through a center of the bottom cap; and the pushing rod protrudes out from the rod bore of the bottom cap.

12. The water controlling valve as claimed in claim 11, wherein the bottom cap has multiple water outlets being formed separately through the bottom cap around the rod bore of the bottom cap.

13. The water controlling valve as claimed in claim 12 further comprising a filter being mounted between the bottom of the valve seat and the bottom cap.

* * * * *